Oct. 21, 1930.  L. JOHNSON  1,779,381
COIL CONVEYER
Filed April 27, 1927  2 Sheets-Sheet 1
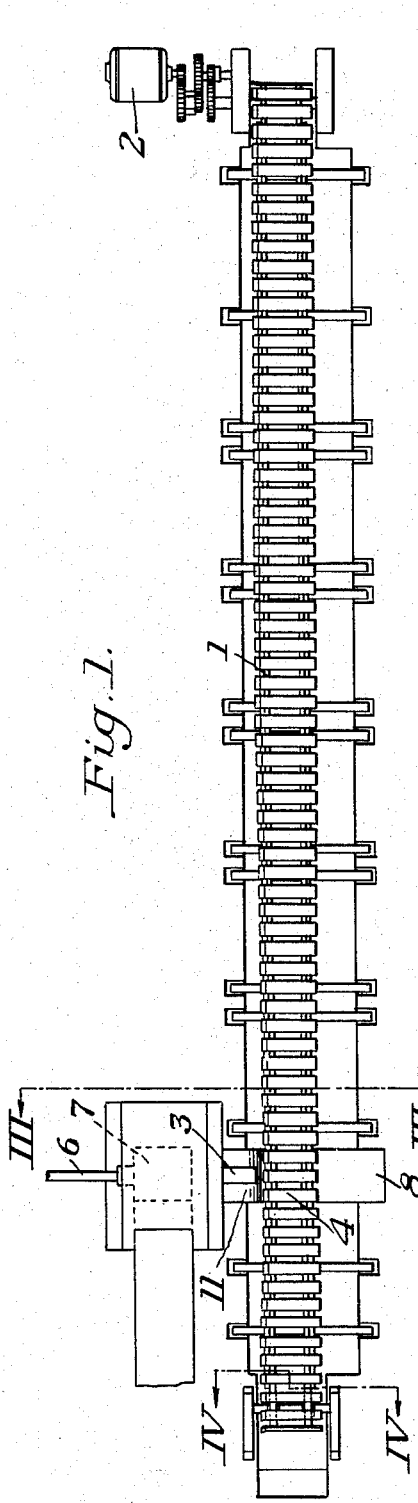
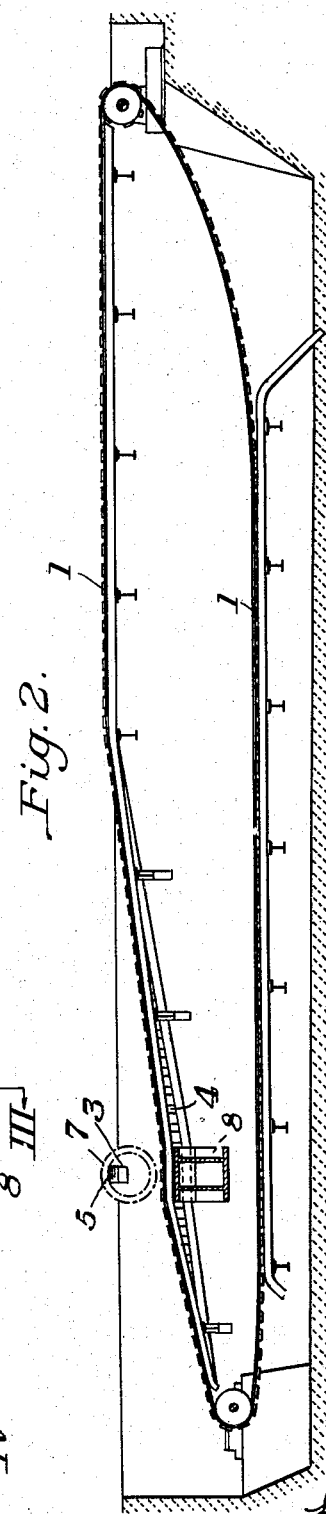
INVENTOR Oct. 21, 1930.   L. JOHNSON   1,779,381
COIL CONVEYER
Filed April 27, 1927   2 Sheets-Sheet 2

Patented Oct. 21, 1930

1,779,381

UNITED STATES PATENT OFFICE

LANE JOHNSON, OF PITTSBURGH, PENNSYLVANIA, ASSIGNOR TO UNITED ENGINEERING & FOUNDRY COMPANY, OF PITTSBURGH, PENNSYLVANIA, A CORPORATION OF PENNSYLVANIA

COIL CONVEYER

Application filed April 27, 1927. Serial No. 187,019.

My invention relates to conveyers and particularly to methods and apparatus for handling coiled material thereby.

One object of my invention is to provide a loading mechanism for a conveyer that shall be shaped to receive freely falling material in a predetermined plane. Another object of my invention is to provide a conveyer for coiled material that shall be adapted to receive freely falling coiled material in a plane such that the finished surfaces of the material shall not be injured. A further object of my invention is to provide an automatic device for loading conveyers handling coiled material.

In the handling of coiled material such as metal strips and the like, it is customary to store the several coils on racks above a conveyer and to provide the rack with mechanism for discharging the coils onto the conveyer as needed. In the event that the coils are allowed to drop onto the conveyer from the storage rack and to strike the conveyer at a pronounced angle, the material of the coil at the point of impact is liable to be injured. If the surface of the coiled material has been given a special finish, such injured portions are liable to render a material portion of the coil unfit for subsequent usage.

In order to avoid such injuries, I propose to tilt the conveyer at a suitable angle opposite to the storage rack such that the plane of the conveyer occupies substantially the plane of the falling coil at the moment of impact, whereby the impact between the coil and the conveyer is distributed over substantially one entire end area of the coil rather than being localized at a single point or line.

Figure 3:
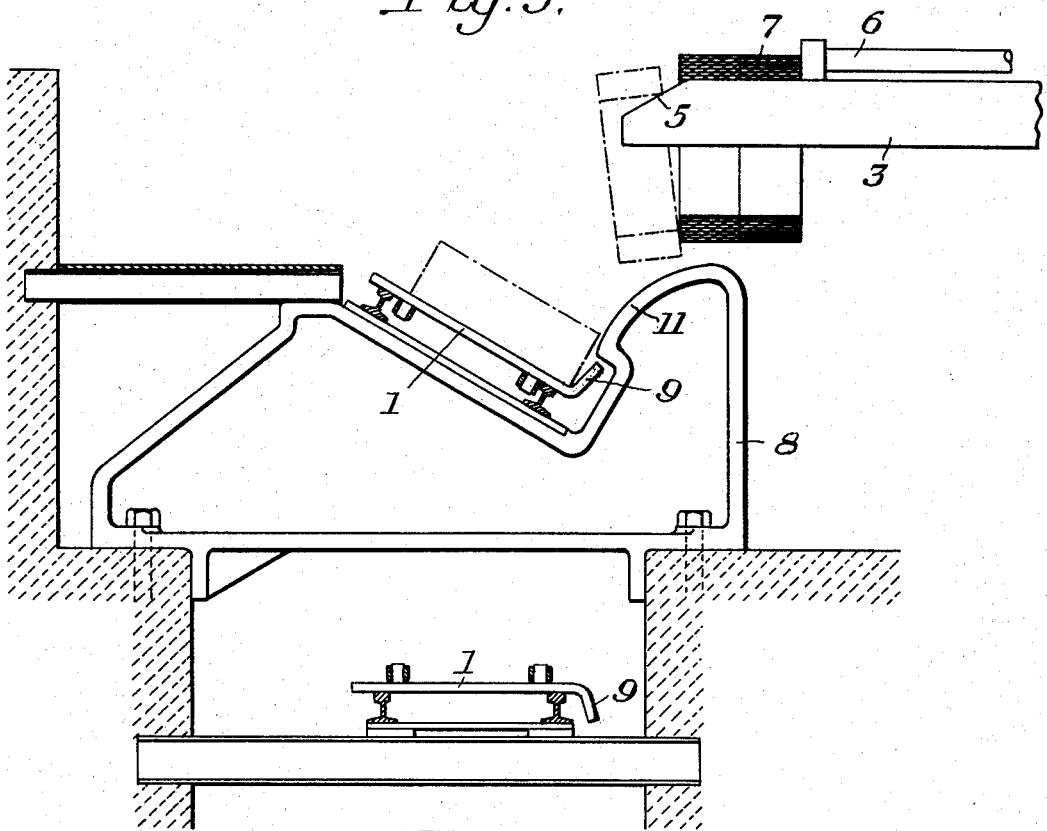
Figure 4:
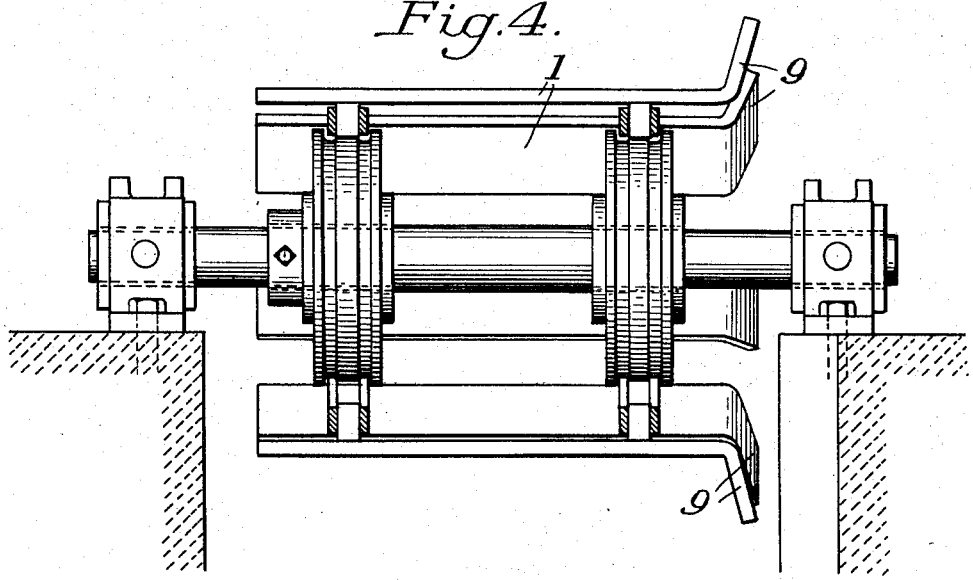

In the illustrative embodiment of the invention, Figure 1 is a plan view of a conveyer embodying my invention. Figure 2 is an elevational view of the conveyer. Figure 3 is a cross-sectional view of the conveyer taken along the line III—III of Fig. 1, and Figure 4 is a cross-sectional view of the conveyer taken along the sectional line IV—IV of Fig. 1.

My invention comprises in general an endless conveyer 1 that is driven by a suitable motor 2 passing beneath a storage rack 3, only one being illustrated, although the invention may be applied to a plurality of different racks opposite each of which the conveyer 1 is distorted as at 4.

The conveyer 1 may be of any commercial form and may be adapted for conveying coiled material to any suitable machine, although here illustrated and described as being for use in transporting rolls of coiled material in a steel mill.

The rack 3 may be in the form of an arm, the outer end of which is provided with a portion 5 disposed at an angle to the axis of the rack 3. A suitable ram 6 may be provided for moving rolls of material 7 outwardly along the rack 3. Opposite to the rack 3 the conveyer 1 is provided with a frame 8 for tilting a portion of it to a predetermined angle. The angular inclination of the conveyer 1 bears a predetermined relation to the angle of the surface 5 of the rack 3 such that coils supplied to the surface 5 will assume such an angle while falling that their plane is substantially in parallelism to the surface of the conveyer at the instant of impact between the conveyer and the roll 7. An edge 9 of the conveyer is upturned to retain the roll 7 after it has been received by the conveyer.

In case one of the coils is discharged from the rack 3, so that it tends to fall vertically, without the rotary movement intended to be imparted thereto by the beveled end 5 of the rack, the coil might fall vertically on the conveyer with injury to the edges thereof. To guard against such contingency, I provide the frame 8 with a curved guide 11. If a vertically falling coil engages the guide 11, it will be tilted and gently deposited on the portion of the conveyer which is inclined laterally, without injury to the edges of the coil.

Accordingly, I have provided a method and apparatus for automatically loading coiled material onto an endless conveyer, characterized by so discharging the coils as to fall freely and by tilting the surface of the conveyer opposite to the point of discharge. The inclination of the conveyer is preferably such that its plane and the plane of the lower end portion of the falling bodies are in substantial parallelism at the point of impact, whereby the force of impact between the coils and the conveyer is distributed over substantially one entire end surface of the material, rather than being localized along a relatively small area with the result of liability to injury in the restricted area.

While I have shown and described my invention in relation to the automatic transferring of cylindrical bodies such as rolls of sheet metal to a conveyer, it is to be understood that such use is merely by way of illustration and is not intended to limit the use of the invention to mill work, as the method and apparatus may be adapted to many other uses that may be embodied and practiced within the scope of the following claims.

I claim:

1. The combination with a device for discharging a body of material into space at an angle to the influence of the force of gravity, of a conveyer for receiving the falling body, the conveyer having a laterally inclined portion for engaging the falling body in a plane substantially parallel to the engaging face of the falling body.

2. The combination with a storage and discharging device for rolls of material, of a conveyer having a laterally inclined portion for receiving the material in a plane substantially parallel to the face of the roll at the time of its engagement with the conveyer.

3. The combination with a storage and discharging device for rolls of material, of a conveyer having a portion laterally inclined to its normal plane for receiving the material in a plane substantially parallel to the face of the roll at the time of its engagement with the conveyer.

4. A conveyer having a normally horizontal conveying surface and having a portion thereof laterally inclined to its normal plane for intercepting a falling body in a predetermined plane, and means for dumping articles onto the inclined portion of the conveyer, so that they fall flat thereon.

5. A conveyer having a normally horizontal conveying surface and having a portion thereof laterally inclined to its normal plane for receiving an object to be conveyed at a predetermined angle to the perpendicular, and means for dumping articles onto the inclined portion of the conveyer, so that they fall flat thereon.

6. The combination with a discharging mechanism for round hollow objects, of a conveyer moving at a pronounced angle to the direction of movement of the discharging mechanism, and means for causing a portion of the conveyer adjacent to the discharging mechanism to be laterally inclined into substantially the plane of the face of a discharged object upon engagement with the conveyer.

7. The combination with a mechanism for discharging coils of material, of a conveyer moving in a direction substantially parallel to the plane of the coiled material, and means for causing a portion of the surface of the conveyer to be laterally inclined sufficiently to simultaneously engage substantially an entire surface of a coil of material received from the discharging mechanism.

8. In combination, a storage rack for coils of material, means for dumping coils therefrom with the plane of the coil at an angle to the horizontal, and a conveyer for receiving said coils having its receiving surface also tilted laterally at an angle to the horizontal so that the coil may land flat on the conveyer.

9. The combination with mechanism for discharging coils into space, of a conveyer comprising a movable carrier, spaced supporting means tending to define a plane through which said carrier travels between said supports, and means for laterally tilting the portion of the carrier between said supports for distorting that portion of the carrier receiving a discharged coil into the plane of a face of a coil at the time of impact.

10. In combination, a device which discharges coils of strip material with the planes of the coils at an angle to the horizontal, and a conveyer for receiving said coils, said conveyer comprising a plurality of runs and having a receiving surface extending substantially in the plane of movement of a conveyer run and tilted laterally at an angle to the horizontal so that coils may land flat on the conveyer.

11. In combination, a device which discharges a coil of strip material into space and a conveyer for receiving said coils, said conveyer comprising a plurality of runs and having a receiving surface extending substantially in the plane of movement of a conveyer run and tilted laterally so that coils may land flat on the conveyer.

12. The combination with delivery means for objects having flat surfaces intersecting to form sharp edges, said means being effective to discharge said objects freely into space with a slight rotary movement, of a conveyer for receiving said objects, having a portion of its surface laterally inclined to the angle assumed by the bottom face of the falling object, whereby the latter lands flat on the conveyer.

In testimony whereof I have hereunto set my hand.

LANE JOHNSON.